United States Patent [19]

Kamei et al.

[11] 4,417,176

[45] Nov. 22, 1983

[54] COMPACT FLUORESCENT LAMP

[75] Inventors: Taketo Kamei; Motokazu Hayashi; Kimio Osada, all of Yokosuka; Mitsutoshi Kimura, Yokohama, all of Japan

[73] Assignee: Tokyo Shibaura Denki Kabushiki Kaisha, Kawasaki, Japan

[21] Appl. No.: 285,731

[22] Filed: Jul. 22, 1981

[30] Foreign Application Priority Data

Jul. 28, 1980 [JP] Japan ................................ 55-103338

[51] Int. Cl.³ .................... H01J 17/34; H01J 7/44; H01J 5/50
[52] U.S. Cl. .......................................... 315/59; 315/58; 315/71; 315/62; 313/493; 313/240; 313/318
[58] Field of Search ..................... 315/58, 59, 71, 108, 315/62; 313/240, 242, 318, 493

[56] References Cited

U.S. PATENT DOCUMENTS

| 3,953,761 | 4/1976 | Guidice | 315/71 |
| 4,187,446 | 2/1980 | Gross et al. | 315/58 |
| 4,199,708 | 4/1980 | Lauwerijssen et al. | 313/493 |
| 4,270,071 | 5/1981 | Morton | 315/58 X |
| 4,300,073 | 11/1981 | Skwirut et al. | 315/59 X |
| 4,347,460 | 8/1982 | Latassa et al. | 313/493 X |

Primary Examiner—Eugene R. LaRoche
Assistant Examiner—Vincent De Luca
Attorney, Agent, or Firm—Oblon, Fisher, Spivak, McClelland & Maier

[57] ABSTRACT

A compact fluorescent lamp having a chassis member, a screw base screwed to the chassis member, a base member secured to the chassis member, a winding envelope having bent part and both ends oriented to the same direction, a ballast surrounded by the winding envelope and a globe member attached to the base member. The ballast is disposed between the bent part and the ends of the winding envelope so as to provide the winding envelope with a desirable coolest wall temperature.

1 Claim, 6 Drawing Figures

COMPACT FLUORESCENT LAMP

BACKGROUND OF THE INVENTION

1. Field of the Invention:

This invention relates generally to a compact fluorescent lamp provided with a screw base, and more particularly, to the disposition of a ballast relative to a winding envelope.

2. Description of the Prior Art:

Fluorescent lamps have been used as a general source of illumination for many years. A fluorescent lamp has high lighting efficiency and a low consumption of electric power in comparison with an incandescent lamp and therefore a compact fluorescent lamp provided on an incandescent lamp base, i.e. an E 26 - type screw base, has been developed. But in order to interchange an incandescent lamp with such a compact fluorescent lamp, it is necessary for the fluorescent lamp to have a folded envelope because, in order to obtain about the same brightness as with an incandescent lamp, it is necessary for the fluorescent lamp's envelope to have a certain minimum length. Such a compact fluorescent lamp is known, for example from U.S. Pat. Nos. 3,953,761 and 4,199,708. Such a fluorescent lamp has a lamp base providing a plurality of screw thread portions, a screw base which is secured to the thread portions of the lamp base, a globe, a partition plate dividing the base side and the globe side, a winding envelope and a ballast provided to the partition plate, in which screw threads are formed on both the lamp base and the screw base itself. However, as the screw base is mounted directly to the lamp base in a conventional lamp, it is necessary for the lamp base to be subjected not only to a torsion moment when attaching to a socket but also to the total weight of the lamp including a heavy ballast, a winding envelope and other equipment attached by way of the partition plate. So it is desirable that the connection between the screw base and the lamp base be modified.

Moreover, in such a fluorescent lamp the ballast and the winding envelope are closely disposed and are covered with the globe so that the temperature of the ballast occasionally reaches around 100° C. The winding envelope is designed to exhibit a maximum luminous efficiency when the coolest wall temperature of the winding envelope is about at 40° C. However, the coolest wall temperature exceeds 40° C. and reaches over 60° C. on account of the radiant heat of the ballast. The luminous efficiency is therefore reduced by about 25% on account of the raising of the coolest wall temperature of the winding envelope. It has been considered to dispose the ballast away from the winding envelope, so as to avoid overheating the winding envelope, but this is undesirable as the fluorescent lamp as a whole then becomes large-sized.

Moreover, according to the lighting direction (i.e. downward lighting with the base-up, upward lighting with the base-down, or side lighting with the base to the side), the coolest wall temperature of the winding envelope will be different. Especially in the case of upward lighting, the coolest wall temperature is most apt to be influenced by the heat of the ballast, and the luminous efficiency shows a declining tendency. Thus, such a fluorescent lamp has the defect of having different luminous efficacies according to the lighting directions.

SUMMARY OF THE INVENTION

Accordingly, one object of this invention is to provide a novel compact fluorescent lamp in which a ballast is disposed between the ends of the winding envelope and a bent part of the winding envelope.

Another object of the invention is to provide a novel compact fluorescent lamp having the same coolest wall temperature of the winding envelope regardless of its lighting direction.

Yet another object of this invention is to provide a novel compact fluorescent lamp maintaining a substantially constant luminous efficiency regardless of its lighting direction.

These and other objects have now been achieved according to this invention by disposing the ballast between the ends and the bent part of the winding envelope described below.

BRIEF DESCRIPTION OF THE DRAWINGS

A more complete appreciation of this invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENT

Figure 1:
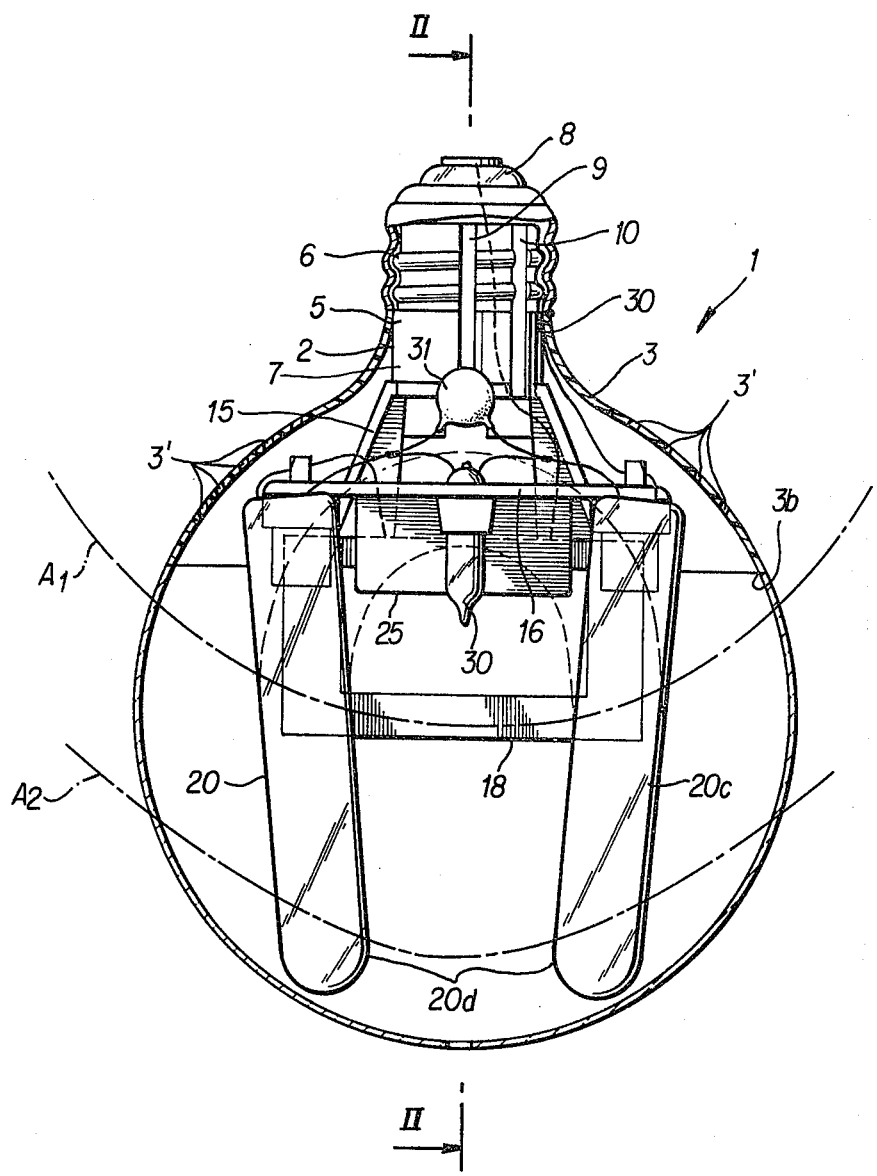
FIG. 1 is a longitudinal cross-sectional view of a compact fluorescent lamp of this invention with the base up.

Referring now to the drawings wherein like reference numerals designate identical or corresponding parts through the several views, and more particularly to FIGS. 1, 2, 3 and 4 thereof, a compact fluorescent lamp 1 having a chassis member 2, a lamp base member 3 and a globe member 4, is shown. The chassis member 2 is made of heat proof plastics (i.e. polycarbonate resin) and includes a cylindrical part 5 at one end thereof.

The cylindrical part 5 consists of a plurality of screw thread portions 6 and a straight portion 7 which is formed to one end of the screw thread portions 6. The cylindrical part 5 is formed with opposing longitudinal recesses 9 and longitudinal slot 10 extending along the entire length of the outer surface thereof. Moreover, the top of each of the recesses 9 and the slot 10 are open.

The hemisphere shaped base member 3, having an upper opening 3a and a lower opening 3b, is attached to the cylindrical part 5 of the chassis member 2. The inside surface of the upper opening 3a is provided with opposing projection parts 12 and the attachment of the cylindrical part 5 to the base member 3 is accomplished by positioning the projections 12 of the base member 3 in the recesses 9 of the chassis member 2. An incandescent lamp screw base 8 i.e. an E - 26 type base is fixed by screwing to the screw thread portions 6 of the cylindrical part 5.

Moreover, the base member 3 is provided with a plurality of arc-shaped openings 3' adjacent the lower peripheral opening 3b. The lower opening 3b of the base member 3 is mounted to the bowl shape globe member 4 which is made of plastics (i.e. polycarbonate) and colored, for example, white. Moreover the globe member 4 has a plurality of openings 4' to flow air near the top thereof. The connection of the base member 3 and the globe member 4 is achieved by cooperating hook portions 13 and 14 provided respectively at the peripheries of the base member 3 and globe member 4.

On the other hand, two arm parts 15 are formed at one end on the cylindrical part 5 of the chassis member 2. A rectangular holding plate 16 is mounted to the top of the arm parts 15. A pair of opposed channel shaped fixing wall members 17 are respectively mounted in the holding plate 16 so as to face each other.

Between these fixing wall members 17, the top of a ballast 18 is positioned and is fixed with its lead wires directed to the base member 3.

A winding envelope 20 is mounted to the holding plate 16 so as to surround the ballast 18. The winding envelope 20 is made by bending a straight glass tube into a U-shape to form a first bent part 20a and a pair of first leg parts 20b, followed by the bending once more of each of the pair of leg parts 20b into second U-shapes to form second leg parts 20c and two pairs of second bent parts 20d. The thus formed winding envelope 20 is of a small and compact shape which may be referred to as a saddle shape envelope.

The holding plate 16 of the chassis member 2 also provides a hook arm member 21 by way of a spreader plate 22 to hold the first bent part 20a of the winding envelope 20 and a maintaining plate 23 having parts 24 to hold both ends 20' of the winding envelope 20. The first bent part 20a of the winding envelope 20 is maintained between the hook arm member 21 and the spreader plate 22. The maintaining plate 23 is formed like a flange having semicircle pieces 24 at both ends thereof and the semicircle pieces 24 hold both ends 20' of the winding envelope 20. Moreover, the holder plate 16 of the chassis member 2 provides a large heat shield plate 25 mounted to the maintaining plate 23 and a small heat shield plate 26 mounted to the spreader plate 22, so as to prevent radiant heat from being conducted directly to the first bent part 20a and the ends 20' of the winding envelope 20.

Reference numerals 30 and 31 respectively refer to a glow starter and a condenser.

The aforementioned ballast 18 is surrounded by the winding envelope 20; that is, the ballast 18 is positioned between the second bent parts 20d and the ends 20' of the winding envelope 20. The distance between the top of the ballast 18 and the ends 20' of the winding envelope 20 is about 10 mm and the distance between the bottom of the ballast 18 and the surface of the second bent parts 20d is about 7 mm.

Figure 2:
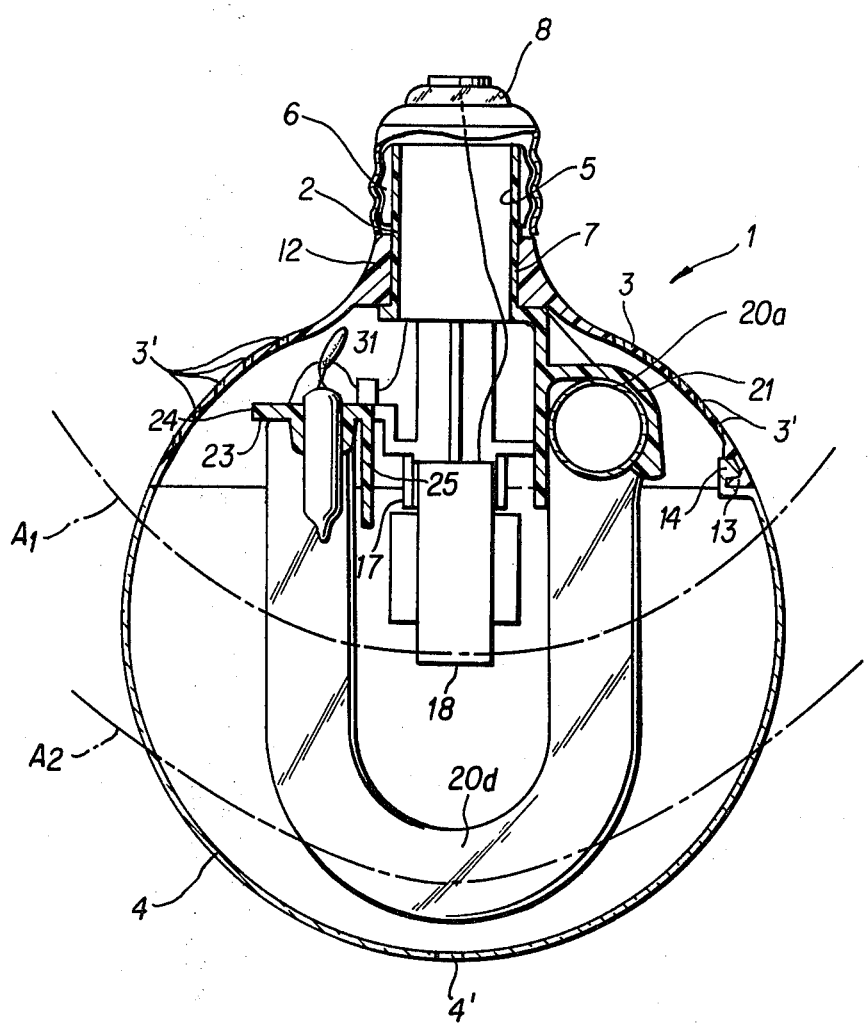
FIG. 2 is a view taken on line II—II of FIG. 1.

In FIG. 1 and FIG. 2, the isothermal lines $A_1$ (50° C.) and $A_2$ (40° C.) of the temperature surrounding the ballast 18 are shown during downward lighting with the base up. That is, the surrounding temperature below the ballast 18 has tendency to fall even at only a small distance from the ballast 18. Consequently, during downward lighting, the areas the second bent parts 20d have not been influenced by the radiant heat of the ballast 18 and the second bent parts 20d thus possess the coolest wall temperature of about 45° C. for the winding envelope 20.

Figure 3:
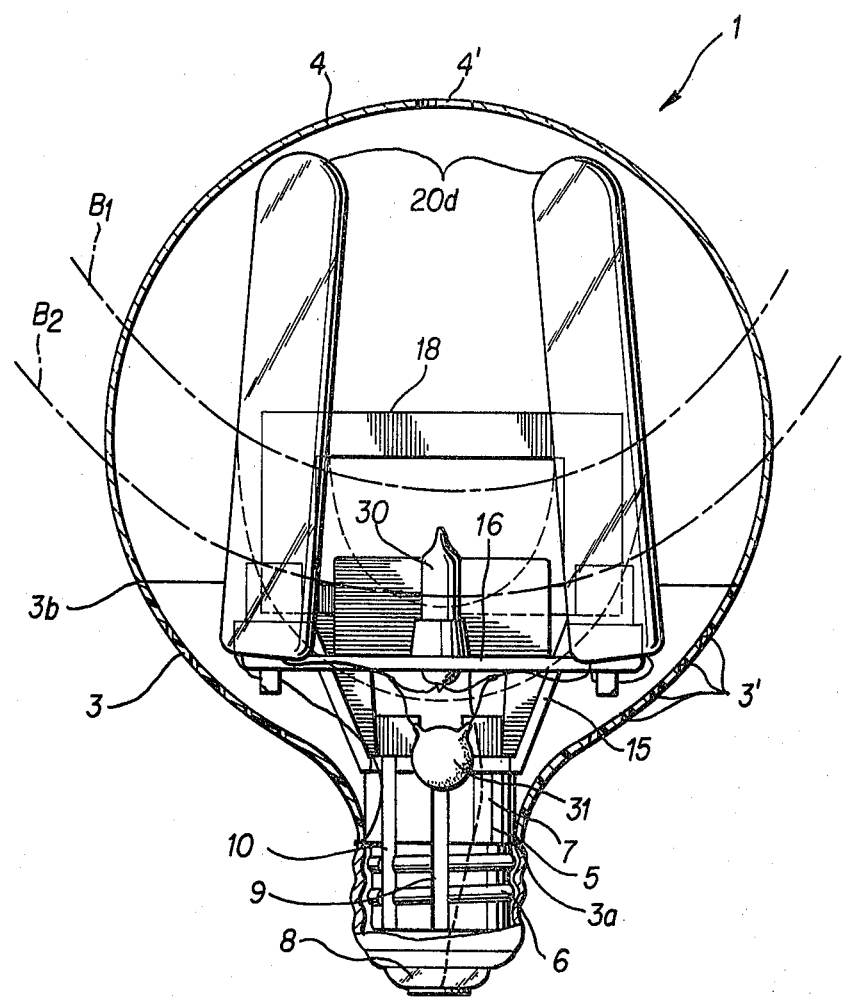
FIG. 3 is a longitudinal cross-sectional view of the compact fluorescent lamp of this invention with the base down.

Conversely when upward lighting with the base-down, the isothermal lines $B_1$ (60° C.) and $B_2$ (40° C.) for the surrounding temperature are shown in FIG. 3. Consequently, the surrounding temperature is lowest around the ends 20' and the first bent part 20a. The coolest wall temperature of about 50° C. for the winding envelope 20 is thus near the first bent part 20a.

Figure 4:
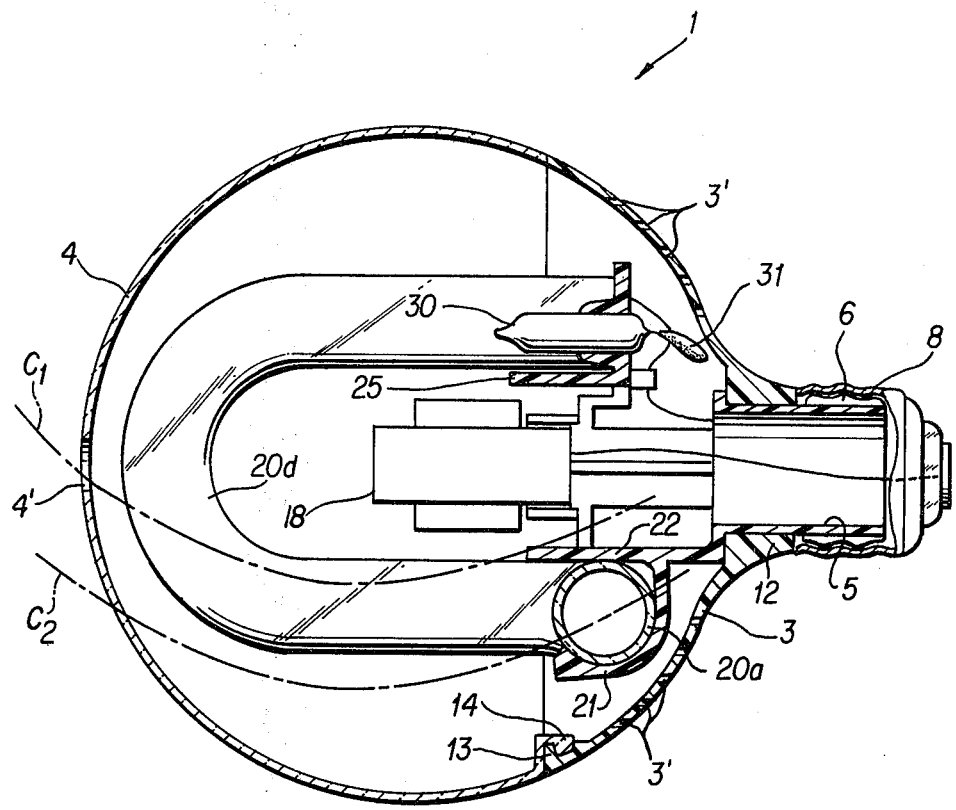
FIG. 4 is a longitudinal cross-sectional view of the compact fluorescent lamp of this invention with the base to the side.

When side lighting with the base to the side, the isothermal lines $C_1$ (60° C.) and $C_2$ (40° C.) of the surrounding temperature are shown in FIG. 4. In this case, the coolest wall temperature of 50° C. for the winding envelope 20 exists near the first bent parts 20a.

When lighting with the base down and the base to the side, the distance between the top of the ballast 18 and the ends 20' of the winding envelope 20 is also about 10 mm and the interval between the bottom of the ballast 18 and the surface of the second bent parts 20d is also about 7 mm.

As already mentioned, as the ballast 18 is surrounded by the winding envelope 20 and as the ballast 18 is positioned between the second bent parts 20d and the ends 20' of the winding envelope 20, the winding envelope 20 comes to have a coolest wall temperature portion regardless of the lighting direction. Once a coolest wall temperature is established on the winding envelope 20, the mercury pressure in the winding envelope 20 is determined by the temperature of that coolest wall temperature of the winding envelope 20. That is, even if there is a portion having a higher temperature than the coolest wall temperature portion of the winding envelope 20, the mercury which is not vaporized in the winding envelope 20 condenses at the coolest wall temperature portion of the winding envelope 20. Consequently, the mercury pressure in the winding envelope 20 is prevented from increasing and is maintained at a desired value. A high luminous efficiency and a high output can thus be maintained regardless of the lighting directions.

Moreover, as the ballast 18 is surrounded by the winding envelope 20, the lamp can be miniaturized by using a narrower spacing between the ballast 18 and envelope 20.

Figure 5:
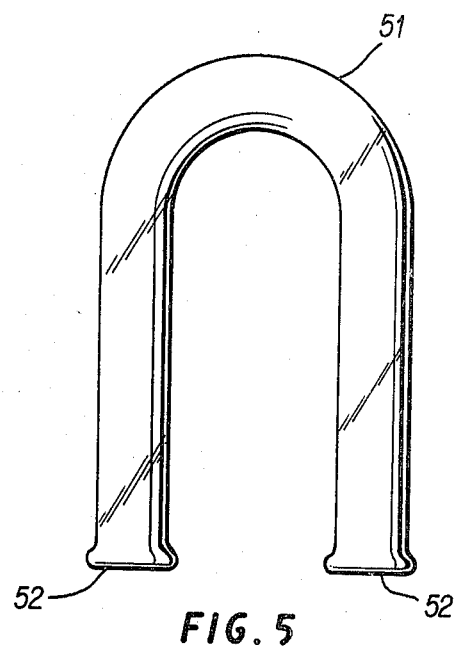
FIGS. 5 and 6 are modifications of the winding envelope of this invention.
Figure 6:
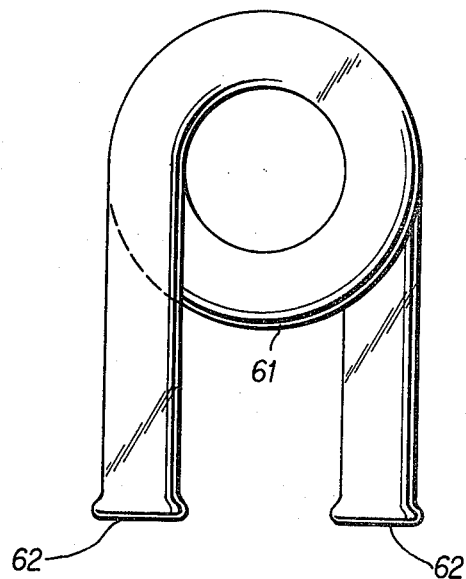

In another embodiment of the invention, the winding envelope may be of a U-shape having a bent part 51 and ends 52 as shown in FIG. 5. Or the envelope may have a spiral bent part 61 and ends 62, shown in FIG. 6.

Obviously, numerous modifications and variations of this invention are possible in light of the above teachings. It is therefore to be understood that within the scope of the appended claims, the invention may be practiced otherwise than as specifically described herein.

What is claimed as new and desired to be secured by Letters Patent of the United States is:

1. A compact flurorescent lamp comprising:
    a chassis member;
    a screw base secured to said chassis member;
    a base member attached to said chassis member;
    a winding envelope formed by bending a straight glass tube into a U-shape, thereby comprising a first bent part and a pair of first leg parts and bending each of said first leg parts into a second U-shape, thereby comprising a pair of second bent parts and two pairs of second leg parts;
    a ballast disposed between said first bent part and said second end parts of said winding envelope; and
    a globe member attached to said base member.

* * * * *